(12) United States Patent
Butler et al.

(10) Patent No.: US 12,391,528 B2
(45) Date of Patent: *Aug. 19, 2025

(54) FULCRUM PRY BAR

(71) Applicant: PolyTex Concrete LLC, Conroe, TX (US)

(72) Inventors: David Butler, Montgomery, TX (US); Jamie Ross, Houston, TX (US)

(73) Assignee: Polytex Concrete LLC, Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/637,167

(22) Filed: Apr. 16, 2024

(65) Prior Publication Data
US 2024/0262667 A1    Aug. 8, 2024

Related U.S. Application Data

(63) Continuation of application No. 17/517,276, filed on Nov. 2, 2021, now Pat. No. 11,964,854.

(51) Int. Cl.
*B66F 15/00* (2006.01)
*B25C 11/00* (2006.01)
(Continued)

(52) U.S. Cl.
CPC ............. *B66F 15/00* (2013.01); *A01B 1/16* (2013.01); *B25C 11/00* (2013.01); *B25D 1/04* (2013.01);
(Continued)

(58) Field of Classification Search
CPC ........ B66F 15/00; B66F 19/005; B25C 11/00; E04D 15/003; E04G 2023/085;
(Continued)

(56) References Cited

U.S. PATENT DOCUMENTS 1,494,557 A * 5/1924 Lumry .................... A01B 1/16
254/131.5
1,570,192 A    1/1926 Younick
(Continued)

FOREIGN PATENT DOCUMENTS

CA        2120878 A1    10/1994
CN      211452865 U      9/2020
(Continued)

OTHER PUBLICATIONS

Understanding Fulcrum and Mechanical Advantage; found at: https://fastercapital.com/topics/understanding-fulcrum-and-mechanical-advantage.html (Year: 2024).*
(Continued)

*Primary Examiner* — Mahdi H Nejad
(74) *Attorney, Agent, or Firm* — Kowert, Hood, Munyon, Rankin & Goetzel, P.C.; Jeffrey C. Hood; Luke Langsjoen

(57) ABSTRACT

A fulcrum prybar includes a shaft portion extending along a first axis, a curved prying portion affixed to a first end of the shaft portion, and a fulcrum portion affixed to the curved prying portion. The fulcrum portion includes two rectangular portions fused together to form an obtuse angle or a right angle cross section. One of the two rectangular portions is oriented such that it is flush with a horizontal surface while the prybar has partially raised an object from the same or another horizontal surface.

19 Claims, 7 Drawing Sheets

(51) Int. Cl.
*E04D 15/00* (2006.01)
*A01B 1/16* (2006.01)
*B25D 1/04* (2006.01)
*B66F 19/00* (2006.01)
*E04G 23/00* (2006.01)
*E04G 23/08* (2006.01)

(52) U.S. Cl.
CPC .......... *B66F 19/005* (2013.01); *E04D 15/003* (2013.01); *E04G 23/006* (2013.01); *E04G 23/08* (2013.01); *E04G 2023/085* (2013.01)

(58) Field of Classification Search
CPC ......... E04G 23/006; E04G 23/08; A01B 1/16; B25D 1/04; F16F 15/067
USPC ............. 254/131, 25, 131.5, 21, 132; 81/45; 294/17, 49
See application file for complete search history.

(56) References Cited

U.S. PATENT DOCUMENTS

| | | | |
|---|---|---|---|
| 2,769,236 A | 11/1956 | Phillips | |
| 2,864,583 A | 12/1958 | Bressler | |
| 2,926,890 A * | 3/1960 | Majors | E01C 23/05 254/132 |
| 4,042,210 A * | 8/1977 | Feldmann | B25C 11/00 254/26 R |
| 4,086,699 A * | 5/1978 | Olkkola | E04D 15/003 254/131.5 |
| 4,477,972 A | 10/1984 | Testa | |
| 6,125,720 A | 10/2000 | Gohman | |
| 6,302,375 B1 | 10/2001 | Heil et al. | |
| 6,505,817 B1 * | 1/2003 | Witter | E04H 17/265 254/25 |
| 6,520,482 B1 | 2/2003 | Bigham | |
| 6,964,442 B1 | 11/2005 | Radcliff | |
| 7,618,020 B2 | 11/2009 | Del Favero | |
| 7,673,848 B1 | 3/2010 | Provines | |
| 8,517,341 B2 | 8/2013 | Edwards | |
| 8,522,649 B2 | 9/2013 | Yousufzai | |
| 8,789,810 B2 | 7/2014 | Weinreich | |
| 10,618,787 B2 | 4/2020 | Kasan | |
| 11,511,571 B2 | 11/2022 | Pizzorno et al. | |
| 2001/0045293 A1 * | 11/2001 | Tam | A01B 1/16 172/378 |
| 2007/0215848 A1 | 9/2007 | Gaudreault | |
| 2009/0151514 A1 * | 6/2009 | Haight | E04D 15/003 81/45 |
| 2011/0113566 A1 | 5/2011 | Holbrook | |
| 2014/0034886 A1 * | 2/2014 | Hoolahan | B66F 15/00 254/130 |
| 2017/0311531 A1 * | 11/2017 | Lawson | A01B 1/16 |

FOREIGN PATENT DOCUMENTS

| | | |
|---|---|---|
| CN | 113101994 A | 7/2021 |
| EP | 0484285 A1 | 10/1991 |

OTHER PUBLICATIONS

Marshalltown (Marshalltown—Industrial Strength Monster Pry Bars; Published on Oct. 11, 2016 at https://www.youtube.com/watch?v=xfYBcgclS0k ) (Year: 2016).*

Marshalltown Monster Pry Bars (Year: 2023).

Access Cover Lifter; Patent No. 2272396; Document ID: GB2272396 A; Inventor Name: Brown Reginald William; Date Published: May 18, 1994; Date Filed: Nov. 8, 1993 (Year: 1994).

* cited by examiner

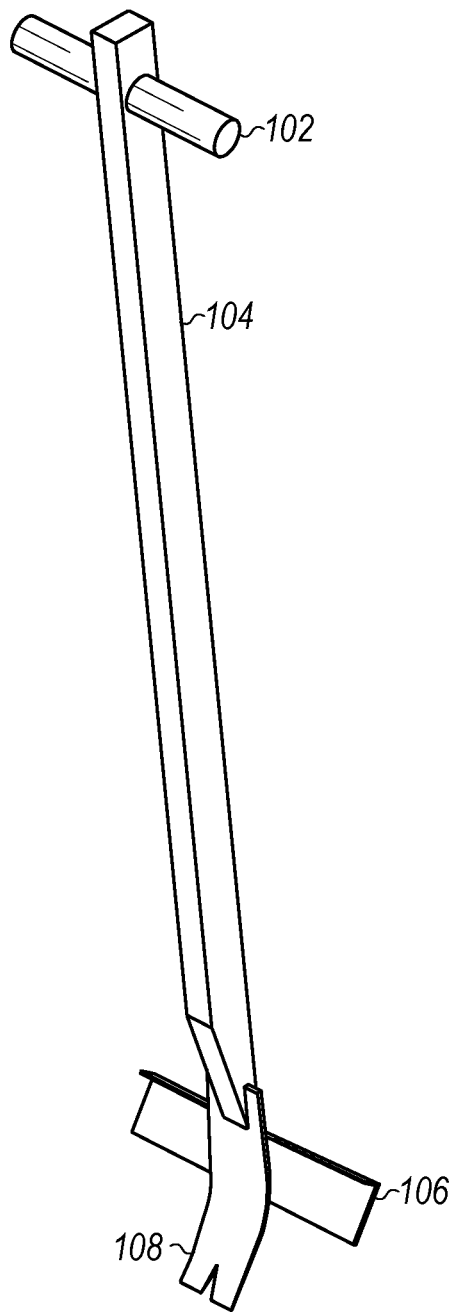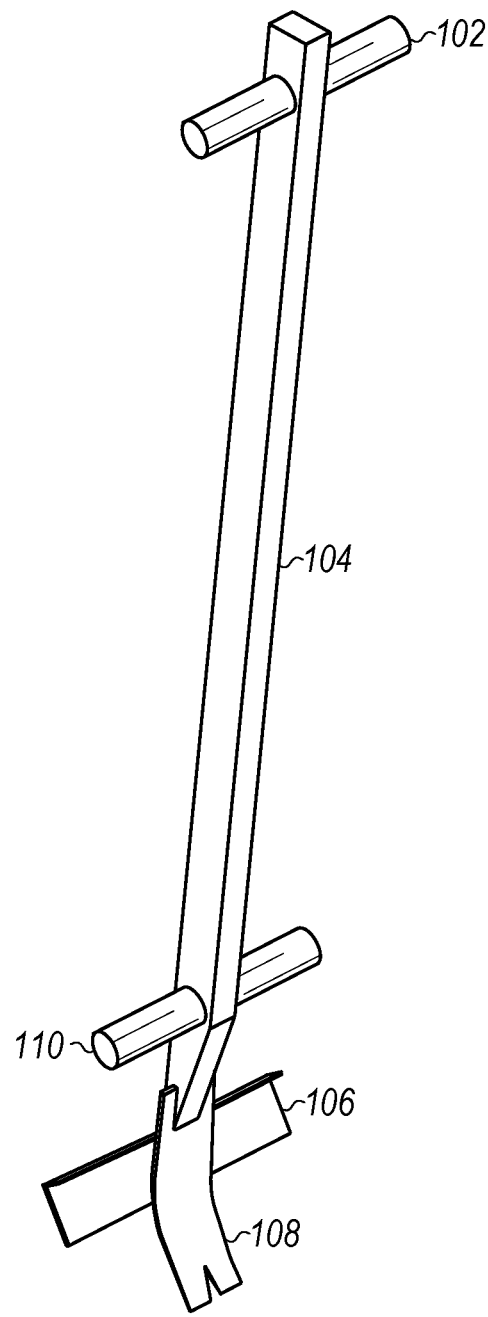
FIG. 1A
FIG. 1B

FULCRUM PRY BAR

PRIORITY INFORMATION

This application is a continuation of U.S. patent application Ser. No. 17/517,276, entitled "Fulcrum Pry Bar," filed Nov. 2, 2021, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to tools for lifting heavy objects, and more particularly to a fulcrum pry bar.

DESCRIPTION OF THE RELATED ART

Humans have designed tools that exploit leverage to lift heavy objects for most of human history. There are currently a wide variety of prybars and fulcrums in use for fields such as construction, roofing, and concrete leveling to lift heavy objects. While existing prybars come in a variety of shapes and sizes, they have structural limitations that inhibit the ability of a user to lift certain types of objects (e.g., large concrete slabs or other types of heavy slabs) and/or to lift objects in certain environments (e.g., when the object rests on soil or another soft ground material). Accordingly, improvements in the field are desired.

SUMMARY

Embodiments relate to devices and methods for lifting objects.

In some embodiments, a prybar includes a shaft portion extending along a first axis, a curved prying portion affixed to a first end of the shaft portion, and a fulcrum portion affixed to the curved prying portion. The fulcrum portion includes a first rectangular portion and a second rectangular portion, where a first edge of the first rectangular portion is affixed to a second edge of the second rectangular portion, a third edge of the first rectangular portion opposite the first edge is affixed to the curved prying portion, and a fourth edge of the second rectangular portion opposite the second edge is affixed to the curved prying portion. The first edge is affixed to the second edge such that a cross section of the first and second rectangular portions forms an obtuse or right angle.

In some embodiments, the first rectangular portion is oriented such that it is flush with a horizontal surface while the prybar has partially raised an object from the same or another horizontal surface. In some embodiments, the first and second edges meet along a line that is positioned to act as a pivot and contact the ground during operation of the prybar to lift an object.

In some embodiments, the first and second rectangular portions extend farther than the curved prying portion along a second axis perpendicular to the first axis.

The devices described herein may be constructed in a number of different sizes and may be used for a large variety of different applications. While exemplary embodiments describe a fulcrum prybar approximately 3-6 feet in length that is especially adept for lifting slabs of concrete, other sizes, relative dimensions, and targeted use cases are also within the scope of the present disclosure.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 1A is an isometric view of a fulcrum prybar, according to some embodiments;

FIG. 1B is an isometric view of a fulcrum prybar including a lower foot handle, according to some embodiments;

Figure 2A:
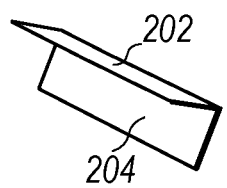
FIGS. 2A-B present a view of the fulcrum portion in isolation, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning "having a structure" that is capable of performing the task or tasks during operation. As such, the component can be configured to perform the task even when the component is not currently being used.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Fulcrum Prybar

In some applications, it may be desirable for a user to lift a heavy object by a certain amount and hold the object in the lifted position for a period of time (e.g., while another person performs a task for which the object should be in the lifted position), and it may be difficult with existing prybars to hold a heavy object at a constant height for a period of time. As another example, when a heavy object is resting on soil or another soft material, a prybar may sink into the ground when attempting to lift the object, making it more difficult to lift the object. Embodiments herein describe a fulcrum prybar to address these and other concerns.

FIG. 1A is an isometric view of a fulcrum prybar, according to some embodiments. As illustrated, the fulcrum prybar includes a shaft portion 104 extending along a first axis, a curved prying portion 108 affixed to a first end of the shaft portion, a handle 102 affixed toward a second end of the shaft portion opposite the first end, and a fulcrum portion 106 affixed to the curved prying portion.

In some embodiments, a prybar head including the fulcrum portion 106 and the curved prying portion 108 may be separately constructed, for subsequent attachment to a shaft portion.

In some embodiments, the curved prying portion curves from the first axis into a third direction, wherein the third direction is perpendicular to the second axis.

In some embodiments, the curved prying portion has a notch centered in the distal end of the curved prying portion (i.e., the end farther from the shaft portion). This may facilitate prying up nails, screws, or other objects.

In some embodiments, the prybar is composed of cast iron, steel, titanium, aluminum, or any other desired metal or other rigid and strong material. In some embodiments, one or more of the shaft portion and/or the handle(s), may be composed of a different material than the fulcrum portion and/or the curved prying portion. As one example, the shaft portion may be composed of a lighter material such as aluminum while the curved prying portion and/or fulcrum portion may be composed of a heavy, stronger material such as steel. Advantageously, the overall weight of the prybar may be reduced by constructing the shaft portion from lighter-weight aluminum.

The components of the prybar may be welded together, or attached through another means. For example, the curved prying portion may be welded to the first end of the shaft portion, and the fulcrum portion may be welded to the curved prying portion.

The prybar of FIG. 1A further includes a handle 102 near the end of the shaft portion opposite the curved prying portion. The handle may be used by a person to facilitate lifting objects. In other words, a handle may be affixed toward a second end of the shaft portion opposite the first end, wherein the handle extends transversally to the first axis.

FIG. 1B illustrates a similar prybar to FIG. 1A, except that the prybar shown in FIG. 1B additionally includes a second foot handle near the same end of the shaft portion as the curved prying portion. The foot handle may be affixed to the shaft portion proximate to the curved prying portion, and the foot handle extends transversally to the first axis. The foot handle may facilitate inserting the prybar under an object by receiving pressure from the foot of a user, and may further be used for stability and/or additional leverage during operation of the prybar.

Figure 2B:
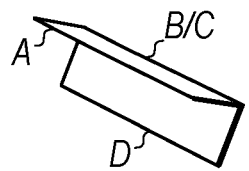

The fulcrum portion is illustrated in isolation in FIGS. 2A-B, and includes a first rectangular portion 202 attached to a second rectangular portion 204 along an edge, creating an "L" shaped fulcrum with a right or obtuse angle. In some embodiments, the first rectangular portion may be shorter in cross section than the second rectangular portion, as shown in the fulcrum portion 412 in FIG. 4A. Alternatively, the first and second rectangular portions may be similar or equal in size as shown in the fulcrum portion 512 in FIG. 5. As shown in FIG. 2B, a first edge of the first rectangular portion (edge "B") is affixed to a first edge of the second rectangular portion (edge "C") such that a cross section of the first (202) and second (204) rectangular portions forms an obtuse or right angle. Said another way, edge B of the first rectangular portion is affixed to and coincides with edge C of the second rectangular portion. A second edge of the first rectangular portion opposite the first edge (edge "A") may be affixed to the curved prying portion of the prybar and a second edge of the second rectangular portion opposite the second edge (edge "D") is also affixed to the curved prying portion.

Figure 3:
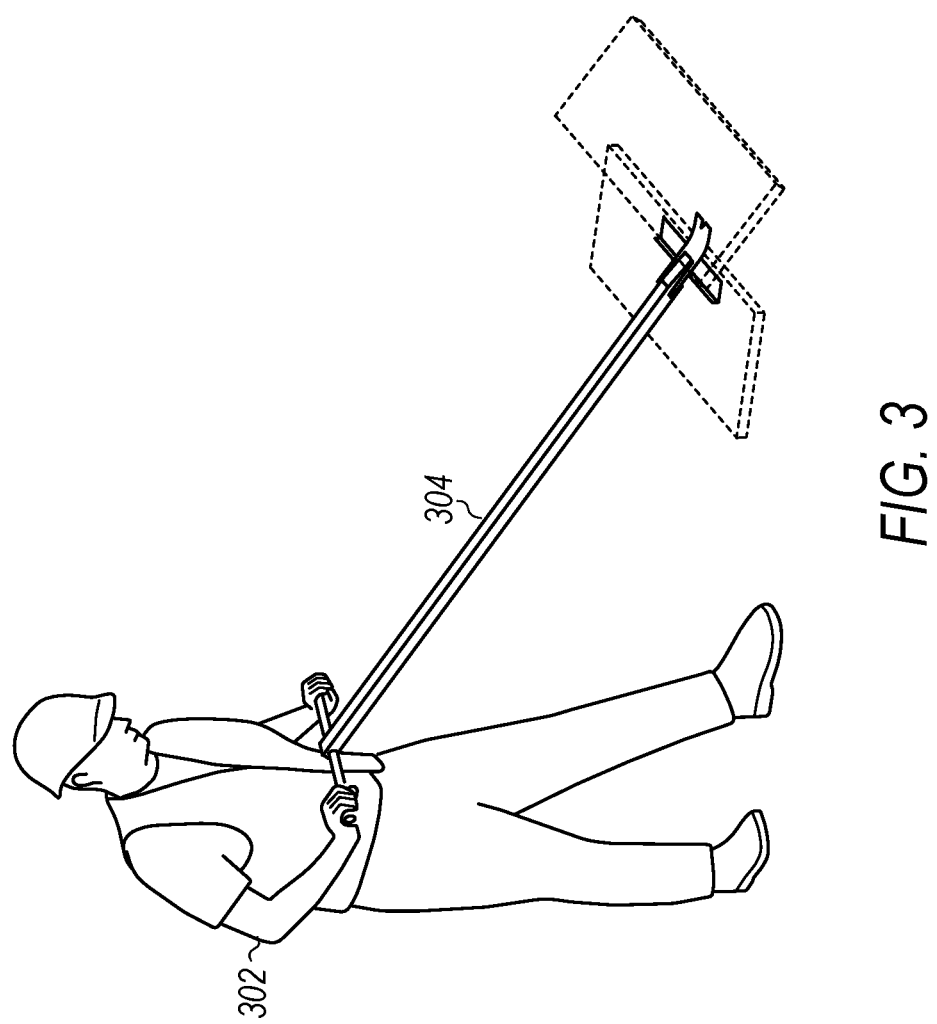
FIG. 3 illustrates a person lifting a slab using a fulcrum prybar, according to some embodiments.

FIG. 3 illustrates a user 302 lifting a slab with a fulcrum prybar 304, according to some embodiments. As illustrated, the fulcrum portion of the prybar provides a pivot point for lifting the slab. The fulcrum portion extends laterally to a wider extent than the shaft of the prybar. Advantageously, the lateral extent of the fulcrum portion may prevent the prybar from sinking into dirt, grass or mud while lifting an object. Additionally, the "L" shaped structure of the fulcrum may enable a user to anchor the object in a partially lifted position when the lower rectangular portion of the fulcrum is flush with the ground. This is shown more clearly in a side-view showing a detail of the prybar (402, 502) in FIGS. 4A-C and 5.

Figure 4A:
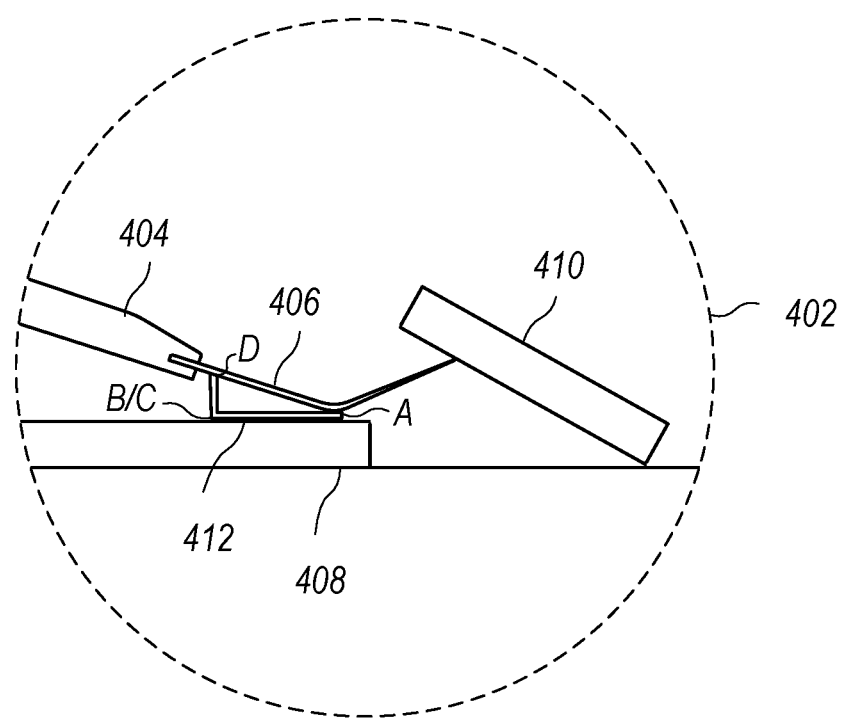
FIG. 4A is a side view of a detail of a fulcrum prybar with a smaller second rectangular portion oriented in an anchored position, according to some embodiments.

As shown in FIG. 4A, the shaft portion 404 and the curved prying portion 406 have lifted the object 410. In the illustrated orientation, the object 410 is "partially" lifted in that the end of the prybar closer to the handle 102 may be further lowered to lift the object higher. In the illustrated orientation, the lower rectangular portion of the fulcrum 412 is flush with the ground 408, providing an anchor for the user to more easily keep the object in the partially lifted position.

Said another way, the first rectangular portion is oriented such that it is flush with a horizontal surface while the prybar has partially raised an object from the horizontal surface. This is illustrated in FIG. 4A, where the first rectangular portion 412 rests flush on the ground 408 when the prybar has partially lifted the object 410. Advantageously, the configuration of the fulcrum may enable a user to hold the object steady in the partially lifted position, as the contact between the first rectangular portion and the ground will increase the range of force exerted by the user that will result in the object maintaining the partially lifted position. For example, while the prybar is in static equilibrium (i.e., unmoving) at the illustrated partially lifted position shown in FIG. 4A, it will take a larger shift in the force exerted by the user to further raise or lower the object than it would take if the fulcrum portion was cylindrical or of another shape that contacts the ground along a single pivot axis.

Figure 4B:
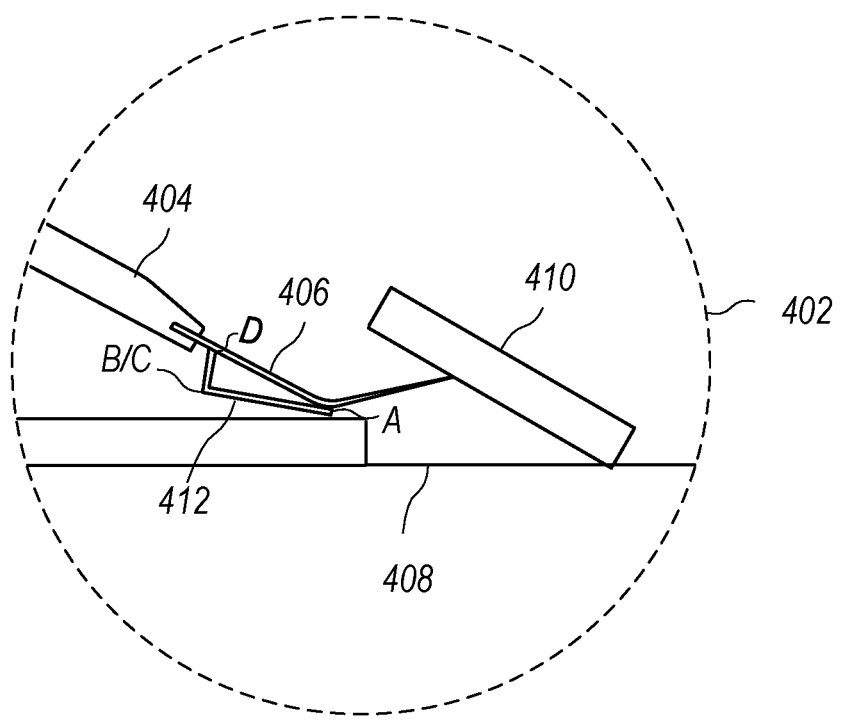
FIG. 4B is a side view of a detail of a fulcrum prybar partially lowered from the anchored position, according to some embodiments.
Figure 4C:
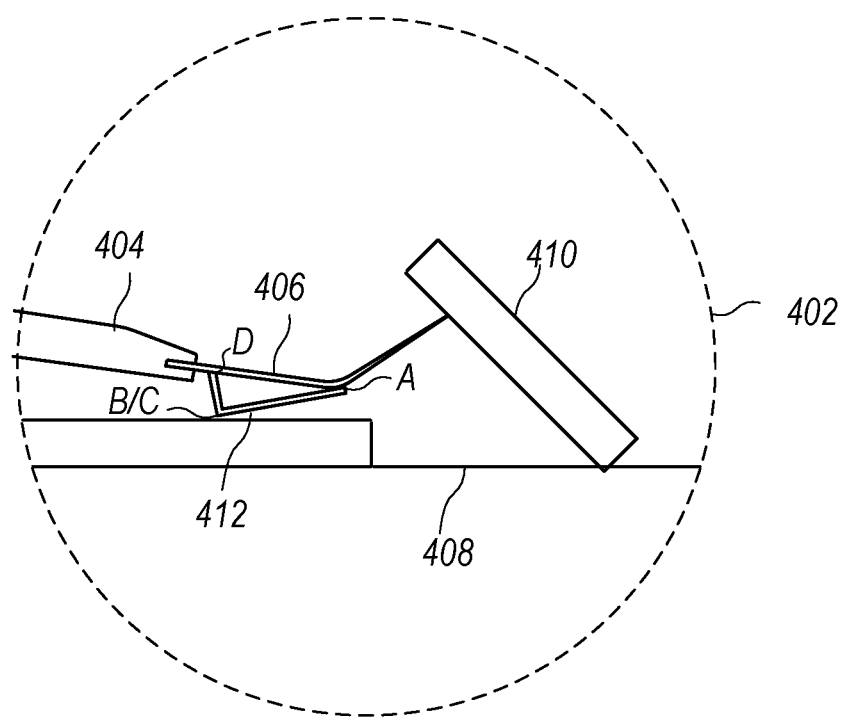
FIG. 4C is a side view of a detail of a fulcrum prybar partially raised from the anchored position, according to some embodiments.

The configuration of the fulcrum portion also causes the prybar to utilize two different pivot axes, depending on the height to which the object is lifted. For example, as illustrated in FIG. 4B, when a user lowers the object relative to the position illustrated in FIG. 4A, the edge of the first rectangular portion that is in contact with the curved prying portion (edge A) will serve as the pivot axis for lifting or lowering the object. Conversely, as illustrated in FIG. 4C, when a user raises the object higher than the position illustrated in FIG. 4A, the edge of the first rectangular portion that is in contact with the second rectangular portion (edge B/C) will serve as the pivot axis for lifting or lowering the object, in some embodiments. As described below, these dual pivot axes may improve the user experience when lifting a heavy slab or other object.

FIGS. 4A-C and 5 illustrate an angled shape for the curved prybar portions 406/506. In other embodiments, the curved prybar portion may have a smoother curvature, a parabolic curvature, or another shape, as desired.

The force necessary to lift a heavy slab with a prybar may vary as the slab is lifted. This may be understood as resulting from the geometric circumstance illustrated in FIG. 6, specifically, that the lifted edge of a slab 602 will follow an arc of a circle 604 as it is lifted, and this arc has a larger vertical component when the slab is closer to the ground and a larger horizontal component when the slab is higher. Accordingly, a user will experience that it is easier to lift the slab when the slab is higher, since an equivalent change in the height of the curved prying portion will result in a smaller change in the height of the center of mass of the slab.

Advantageously, the dual pivot axes of the fulcrum prybars described herein may exploit this physical circumstance to improve the user experience. For example, when a slab is hoisted in an orientation where edge A serves as the pivot axis, the lever arm of the prybar will be longer than when edge B serves as the pivot axis, since edge B is closer to the application of force at the handles 102. A longer lever arm grants a larger torque for a given force, such that a user of the illustrated fulcrum prybar may exert a larger torque for a given force when the slab is lower than the position illustrated in FIGS. 4 and 5. Conversely, a user may exert a smaller torque for the given force when the slab is higher than this position. Because the slab may be lifted with less force while in the higher position, the user will experience less variance in exertion while lifting the slab through the entire range of motion. In other words, the extended lever arm in the lower position compensates for the larger force required to lift the slab in the lower position (and vice versa for a higher position), such that user may exert a less variable force to lift the slab through the entire range of motion, improving the user experience.

In some embodiments, edges B and C meet along a line that is positioned to contact the ground during operation of the prybar to lift an object for at least a portion of the range of motion of the prybar.

In some embodiments, the first and second rectangular portions extend farther than the curved prying portion along a second axis perpendicular to the first axis. Advantageously, this lateral extent of the fulcrum portion may brace the prybar and prevent the prybar from sinking into soil or mud when lifting a heavy object.

In some embodiments, edges A, B, C and D are oriented along a second axis perpendicular to the first axis.

Figure 7:
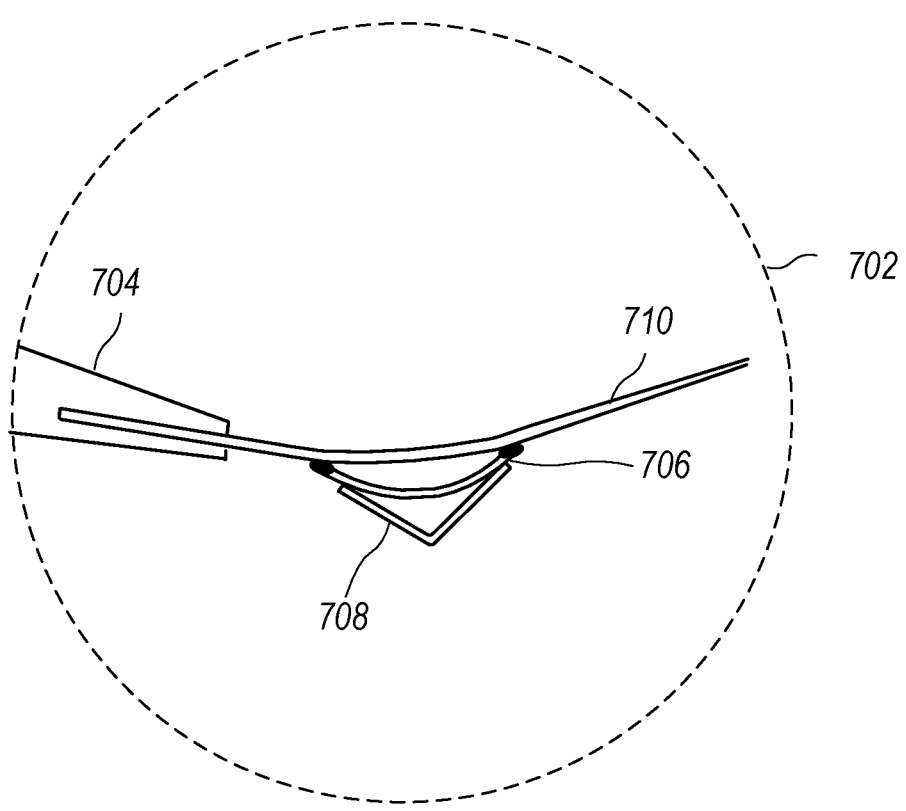
FIG. 7 is a side view of a detail of a fulcrum prybar with a curved brace positioned between the prying portion and the fulcrum, according to some embodiments.

FIG. 7 illustrates a detail of a sideview of a fulcrum prybar, according to some embodiments. The prybar illustrated in FIG. 7 differs from other prybars described herein through the addition of a curved brace 706 affixed in between the curved prying portion 710 and the fulcrum portion 708. The curved brace may be configured to have a larger curvature (i.e., a smaller radius of curvature) than the curved prying portion, and may serve as an intermediate brace to provide an increased contact area with the fulcrum portion (relative to when the fulcrum portion is directly attached to the curved prying portion). This increased contact area may advantageously strengthen the bond (e.g., the weld) between the fulcrum portion, the curved brace, and the curved prying portion, thereby improving the structural integrity and strength of the prybar.

Figure 5:
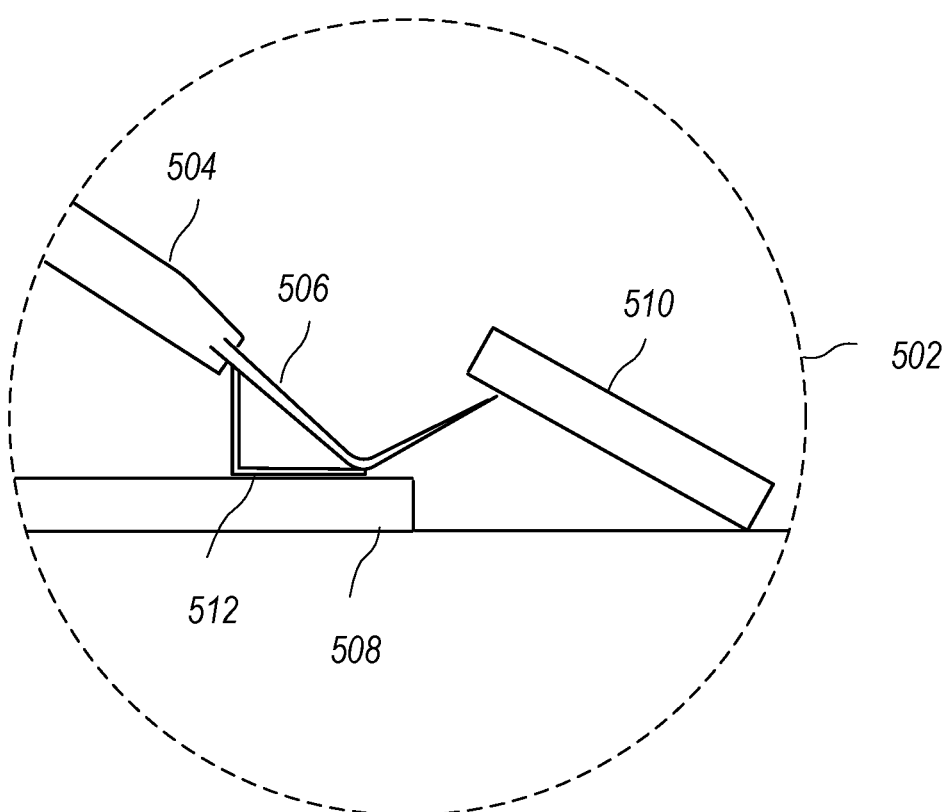
FIG. 5 is a side view of a detail of a fulcrum prybar with comparably sized halves of the fulcrum, according to some embodiments.
Figure 6:
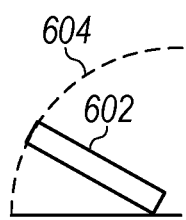
FIG. 6 illustrates the range of motion of a slab as it is lifted.

Note that the curved prying portion 710 shown in FIG. 7 has a smoother curvature than the more angled curved prying portions 406/506 shown in FIGS. 5 and 6. In general, any desired shape and/or curvature may be used for the curved prying portion, as desired.

The fulcrum prybar may be from 3 to 6 feet in total length, such that it is comfortable to use by an average size person, in some embodiments. Alternatively, the fulcrum may be arbitrarily larger or smaller, depending on the use case, as desired. The fulcrum prybar may provide sufficient leverage for an average strength adult to lift a 10' square slab of concrete with moderate effort, in some embodiments.

Embodiments of the present disclosure may be realized in any of various forms. The embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A prybar, comprising:
   a shaft portion extending along a first axis;
   a prying portion affixed to a first end of the shaft portion, wherein the prying portion curves away from the first axis and toward a third axis, wherein the third axis is perpendicular to the first axis;
   a fulcrum portion affixed to the prying portion, wherein the fulcrum portion comprises:
      a first rectangular portion; and
      a second rectangular portion,
   wherein a first edge of the first rectangular portion is affixed to a second edge of the second rectangular portion, wherein the first edge is affixed to the second edge such that a cross section of the first and second rectangular portions forms an obtuse or right angle,
   wherein a third edge of the first rectangular portion opposite the first edge is affixed to the prying portion at a first location,
   wherein a fourth edge of the second rectangular portion opposite the second edge is affixed to the prying portion at a second location, wherein the first location is closer to a distal end of the prying portion than the second location,
   wherein the fulcrum portion is affixed to the prying portion such that a triangular cavity is formed between the fulcrum portion and the prying portion, and
   wherein the first and second rectangular portions extend along a second axis farther than the prying portion extends along the second axis, wherein the second axis is perpendicular to the first axis and the third axis, and wherein the first, second, third and fourth edges are oriented along the second axis.

2. The prybar of claim 1,
   wherein the first rectangular portion is oriented such that it is flush with a horizontal surface while the prybar has partially raised an object.

3. The prybar of claim 1,
wherein the first and second edges meet along a line that is positioned to contact the ground during operation of the prybar for a portion of a range of motion to lift an object.

4. The prybar of claim 1,
wherein the prying portion comprises a single bend,
wherein the single bend causes the distal end of the prying portion to bend away from the first axis and toward the third axis.

5. The prybar of claim 1, further comprising:
a handle affixed to the shaft portion proximate to the prying portion, wherein the handle extends along the second axis.

6. The prybar of claim 1,
wherein the first, second, third and fourth edges are oriented along the second axis.

7. The prybar of claim 1,
wherein the prying portion comprises a notch centered in the distal end of the prying portion.

8. The prybar of claim 1,
wherein the prybar is composed of steel or cast iron, and
wherein the prying portion is welded to the first end of the shaft portion and the fulcrum portion is welded to the prying portion.

9. The prybar of claim 1,
wherein the third edge of the first rectangular portion is oriented to serve as a first pivot axis for a first portion of a range of motion of the prybar while lifting an object, and
wherein a line joining the first edge of the first rectangular portion and the second edge of the second rectangular portion is oriented to serve as a second pivot axis for a second portion of the range of motion of the prybar, and
wherein the second portion of the range of motion is higher than the first portion of the range of motion.

10. The prybar of claim 9,
wherein a lever arm of the prybar is higher when the third edge serves as the first pivot axis than when the line joining the first and second edges serves as the second pivot axis.

11. A prybar head configured for attachment to a prybar shaft, the prybar head comprising:
a prying portion configured to attach to the prybar shaft, wherein the prybar shaft extends along a first axis, and wherein the prying portion curves away from the first axis and toward a third axis, wherein the third axis is perpendicular to the first axis;
a fulcrum portion affixed to the prying portion, wherein the fulcrum portion comprises:
a first rectangular portion; and
a second rectangular portion,
wherein a first edge of the first rectangular portion is affixed to a second edge of the second rectangular portion, wherein the first edge is affixed to the second edge such that a cross section of the first and second rectangular portions forms an obtuse or right angle,
wherein a third edge of the first rectangular portion opposite the first edge is affixed to the prying portion at a first location,
wherein a fourth edge of the second rectangular portion opposite the second edge is affixed to the prying portion at a second location, wherein the first location is closer to a distal end of the prying portion than the second location,
wherein the fulcrum portion is affixed to the prying portion such that a triangular cavity is formed between the fulcrum portion and the prying portion, and
wherein the first and second rectangular portions extend along a second axis farther than the prying portion extends along the second axis, wherein the second axis is perpendicular to the first axis and the third axis, and wherein the first, second, third and fourth edges are oriented along the second axis.

12. The prybar head of claim 11,
wherein the prying portion comprises a single bend,
wherein the single bend causes the distal end of the prying portion to bend away from the first axis and toward the third axis.

13. The prybar head of claim 11,
wherein the first rectangular portion is oriented such that it is flush with a horizontal surface while attached to the prybar shaft when the prybar head has partially raised an object.

14. The prybar head of claim 11,
wherein, while attached to the prybar shaft, the first and second edges meet along a line that is positioned to contact the ground during operation of the prybar shaft for a portion of a range of motion to lift an object.

15. The prybar head of claim 11,
wherein the prybar head is composed of steel or cast iron, and
wherein the fulcrum portion is welded to the prying portion.

16. The prybar head of claim 11,
wherein, when the prybar head is attached to the prybar shaft:
the third edge of the first rectangular portion is oriented to serve as a first pivot axis for a first portion of a range of motion of the prybar shaft while lifting an object, and
wherein a line joining the first edge of the first rectangular portion and the second edge of the second rectangular portion is oriented to serve as a second pivot axis for a second portion of the range of motion of the prybar shaft, and
wherein the second portion of the range of motion is higher than the first portion of the range of motion.

17. The prybar head of claim 16,
wherein, when the prybar head is attached to the prybar shaft, a lever arm of the prybar shaft is higher when the third edge serves as the first pivot axis than when the line joining the first and second edges serves as the second pivot axis.

18. A prybar head configured for attachment to a prybar shaft, the prybar head comprising:
a prying portion configured to attach to the prybar shaft, wherein the prybar shaft extends along a first axis, wherein the prying portion curves away from the first axis and toward a third axis, wherein the third axis is perpendicular to the first axis;
a fulcrum portion affixed to the prying portion, wherein the fulcrum portion comprises:
a first rectangular portion; and
a second rectangular portion,
wherein a first edge of the first rectangular portion is affixed to a second edge of the second rectangular portion, wherein the first edge is affixed to the second edge such that a cross section of the first and second rectangular portions forms an obtuse or right angle, wherein a third edge of the first rectangular portion opposite the first edge is affixed to the prying portion at a first location, wherein a fourth edge of the second rectangular portion opposite the second edge is affixed to the prying portion at a second location, wherein the first location is closer to a distal end of the prying portion than the second location, wherein the fulcrum portion is affixed to the prying portion such that a triangular cavity is formed between the fulcrum portion and the prying portion, and wherein the first and second rectangular portions extend along a second axis farther than the prying portion extends along the second axis, wherein the second axis is perpendicular to the first axis and the third axis, and wherein the first, second, third and fourth edges are oriented along the second axis.

19. The prybar head of claim 18, wherein the prying portion comprises a single bend, wherein the single bend causes the distal end of the prying portion to bend away from the first axis and toward the third axis.

* * * * *